United States Patent
Nugraha et al.

(10) Patent No.: US 12,175,712 B2
(45) Date of Patent: Dec. 24, 2024

(54) ADAPTIVE COMPRESSION FOR RADAR DATA

(71) Applicant: Infineon Technologies AG, Neubiberg (DE)

(72) Inventors: Dian Tresna Nugraha, Bandung (ID); Simon Achatz, Munich (DE); Farhan Bin Khalid, Munich (DE)

(73) Assignee: Infineon Technologies AG, Neubiberg (DE)

( * ) Notice: Subject to any disclaimer, the term of this patent is extended or adjusted under 35 U.S.C. 154(b) by 453 days.

(21) Appl. No.: 17/409,957

(22) Filed: Aug. 24, 2021

(65) Prior Publication Data

US 2023/0063224 A1 Mar. 2, 2023

(51) Int. Cl.
| | | |
|---|---|---|
| *G06T 9/00* | (2006.01) | |
| *G01S 13/06* | (2006.01) | |
| *G01S 13/58* | (2006.01) | |
| *G01S 13/86* | (2006.01) | |
| *G01S 13/931* | (2020.01) | |

(52) U.S. Cl.
CPC ............ *G06T 9/00* (2013.01); *G01S 13/06* (2013.01); *G01S 13/58* (2013.01); *G01S 13/867* (2013.01); *G01S 13/931* (2013.01)

(58) Field of Classification Search
CPC . G06T 9/00; G01S 13/06; G01S 13/58; G01S 13/867; G01S 13/931; G01S 7/003; G01S 7/023
See application file for complete search history.

(56) References Cited

U.S. PATENT DOCUMENTS

| | | | |
|---|---|---|---|
| 6,760,487 B1* | 7/2004 | Linares ................ | H04N 19/117 375/E7.161 |
| 9,933,520 B1* | 4/2018 | Campbell .............. | G01S 13/42 |
| 10,416,254 B2 | 9/2019 | Addison | |
| 10,416,284 B2 | 9/2019 | Addison et al. | |
| 11,533,484 B1* | 12/2022 | Anumula .............. | G06V 20/56 |
| 11,644,534 B2* | 5/2023 | Maor ........................ | G01S 7/03 342/70 |
| 2004/0160353 A1* | 8/2004 | Cirillo ..................... | H03M 7/30 342/25 R |
| 2015/0346321 A1* | 12/2015 | Jansen .................... | H03M 7/30 342/107 |
| 2019/0317205 A1* | 10/2019 | Meissner ............ | H03M 7/3059 |

(Continued)

FOREIGN PATENT DOCUMENTS

DE   0959369 A2 *   5/1999

OTHER PUBLICATIONS

17409957_2023-12-13_EP_0959369_A2_M.pdf, machine translation of EP 0959369 A2 (Year: 1999).*

(Continued)

*Primary Examiner* — Timothy A Brainard
*Assistant Examiner* — Kenneth W Good
(74) *Attorney, Agent, or Firm* — Eschweiler & Potashnik, LLC

(57) ABSTRACT

Systems, methods and circuitries are disclosed for compressing radar data. In one example, a radar sender unit includes adaptive compression circuitry configured to determine tuning data, wherein the tuning data is based on one or more operating conditions; compress radar data based on the tuning data; and transmit the compressed radar data to a radar control unit for further processing.

24 Claims, 7 Drawing Sheets

(56) References Cited

U.S. PATENT DOCUMENTS

| | | | |
|---|---|---|---|
| 2020/0255014 A1* | 8/2020 | Meroux | G06N 20/00 |
| 2020/0341134 A1 | 10/2020 | Roger | |
| 2021/0208236 A1* | 7/2021 | John Wilson | G06N 3/08 |
| 2021/0333385 A1* | 10/2021 | Rohani | G01S 13/87 |
| 2022/0196795 A1* | 6/2022 | Wu | G01S 7/354 |
| 2022/0214441 A1* | 7/2022 | Labusch | G01S 13/536 |
| 2022/0321777 A1* | 10/2022 | Woinoski | H04N 19/132 |
| 2022/0335279 A1* | 10/2022 | Tyagi | G06N 20/00 |
| 2022/0350995 A1* | 11/2022 | Bangalore Ramaiah | B60W 60/0025 |

OTHER PUBLICATIONS

Mani, Anil et al; "Memory Compression and Decompression Engine for TI mmWave Radar"; Texas Instruments, Application Report, Dec. 2019.

* cited by examiner

ADAPTIVE COMPRESSION FOR RADAR DATA

FIELD

The present disclosure relates to the field of radar circuits and in particular to methods, systems, and circuitry for using radar signals for detecting objects.

BACKGROUND

Radio frequency (RF) transceivers can be found in numerous applications, particularly in the field of wireless communications and radar sensors. In the automotive sector there is an increasing demand for radar sensors for use in detecting vehicles and other objects near a sensor-equipped vehicle.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
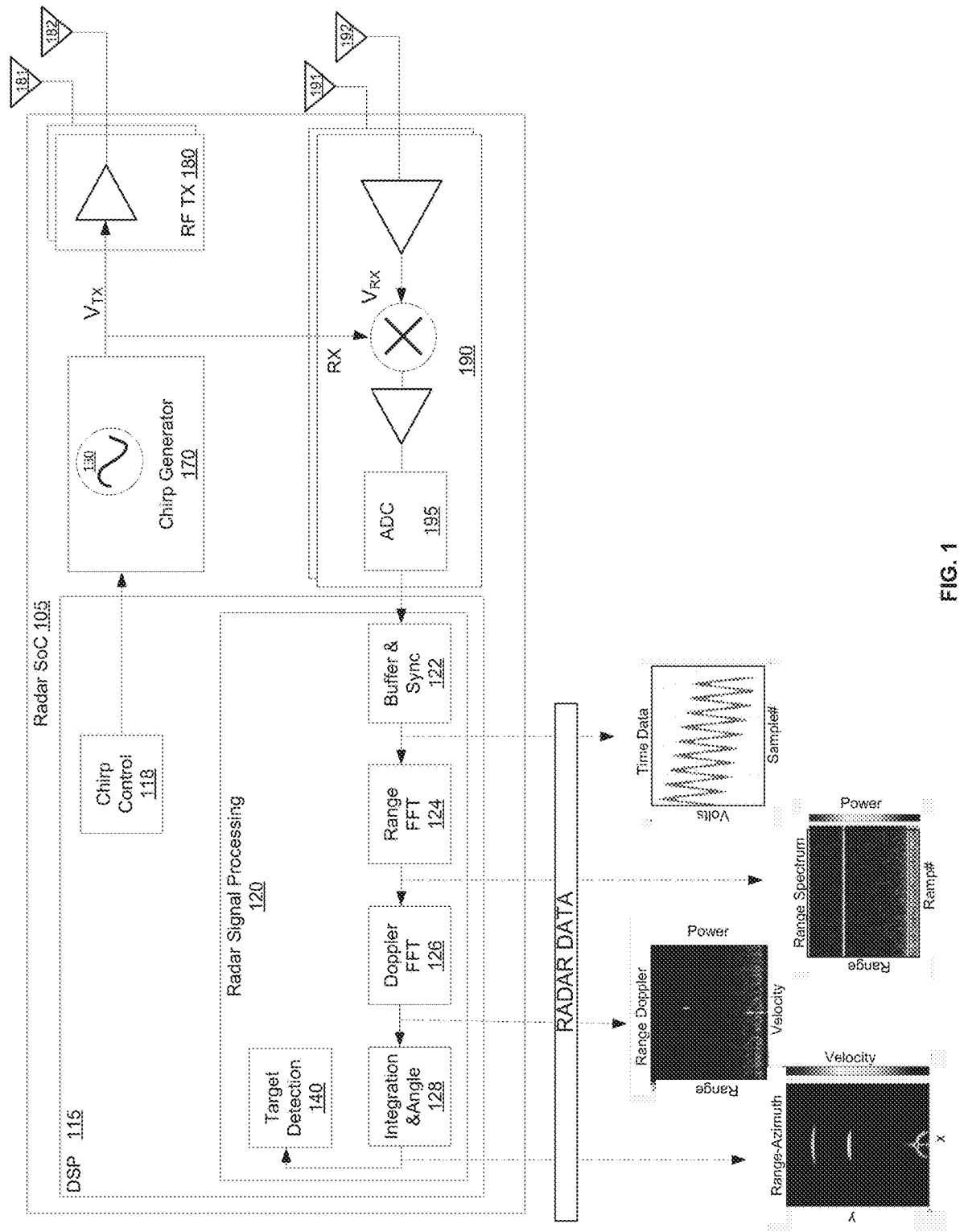
FIG. 1 illustrates an example radar system on chip (SoC) in accordance with various aspects described.

Throughout this description, components that are exemplary versions of a same or analogous component are assigned reference characters having the same value for the last two digits while the initial digit(s) of reference characters are assigned based on the FIG. number in which they are first introduced.

FIG. 1 illustrates an example radar system on chip (SoC) 105. The SoC 105 includes digital signal processing (DSP)) circuitry 115, analog chirp generator circuitry 170, one or more transmit chains 180, one or more receive chains 190, one or more transmit antennas 181, 182, and one or more receive antennas 191, 192. In some examples a transmit chain and receive chain pair may be implemented in an associated monolithic microwave integrated circuit (MMIC). The DSP includes chirp control circuitry 118 controls an oscillator-based chirp generator circuitry 170 to generate a chirp signal at an operating frequency. The chirp signal is amplified by a power amplifier (PA) in each transmit chain 180 and broadcast by a corresponding antenna 181, 182.

Each receive chain 190 is coupled to a corresponding antenna 191 or 192 that receives a signal that includes echoes (reflections of the transmitted chirp signal). The received signal is amplified by a low noise amplifier (LNA) and combined by a mixer with the chirp signal. The mixing process generates a signal having a phase equal to a difference in phase between the transmit and receive signals (called the beat frequency signal). A filtered beat frequency signal is then converted to a digital signal by analog-to-digital converter (ADC) 195 and provided to the DSP circuitry 115 for digital processing that ultimately accomplishes target detection.

The DSP includes buffer and synchronization circuitry 122 that collects time-domain radar signal amplitude data, which may be signed and complex valued, from the various receive chains and synchronizes them for processing. The example time-domain radar signal amplitude data illustrated in FIG. 1 illustrates real-only samples from multiple receive chains, overlaid, for a single FMCW ramp. There are multiple successive ramps in one FMCW chirp-sequence.

Range FFT circuitry 124 obtains range spectrum data by performing a discrete Fourier transform (DFT) on the time-domain radar amplitude data along the samples dimension. The resulting frequency data represents the range (e.g., radial distance in front of the antennas) of targets, with usually negligible range shift influenced by a target's velocity. The range spectrum data is complex valued since it is the output of a DFT function and may also be signed. An example of range spectrum data is shown in FIG. 1.

Doppler FFT circuitry 126 obtains range Doppler spectrum data by performing a DFT on the range spectrum data along the ramp dimension. The resulting frequency data represents the velocity of targets. The range Doppler data is complex valued and may also be signed. An example of range Doppler spectrum data is shown in FIG. 1.

Integration and angle circuitry 128 integrates the range Doppler data from the different receive chains 190 and also detects peaks in the range Doppler data. These peaks are analyzed to determine a spatial angle and direction of the targets. The output of the integration and angle circuitry 128 range angle azimuth spectrum data and/or range elevation spectrum data. An example of range angle azimuth and/or elevation spectrum data which is also complex valued and may be signed is illustrated in FIG. 1. The range angle azimuth and/or elevation spectrum data is provided to target detection circuitry 140 which uses an algorithm, such as constant false alarm rate (CFAR), to detect targets. This detected target information is the output of the radar SoC 105.

Several specific processing units (122, 124, 126, 128, 140) have been described with respect to the processing of radar signals. This is just one possible configuration for the radar signal processing circuitry 120. For the purposes of this disclosure, the output of the buffer and synchronization circuitry 122 (time-domain radar signal amplitude data), the output of the range FFT circuitry 124 (range spectrum data), the output of the Doppler FFT circuitry 126 (range Doppler spectrum data), and the output of the integration and angle circuitry 126 (range angle azimuth and/or elevation spectrum data) are each examples of "radar data" which is to be generally construed as including any data that results from processing of a received radar signal. Thus, if different processing steps or units are included in the radar signal processing circuitry 120, radar data includes intermediate outputs of or data generated by the different processing steps.

As vehicles incorporate more radar based features such as obstacle detection and driver assistance, target detection algorithms are becoming more elaborate and demand increased amounts of data to provide desired resolution and accuracy. Performing the target detection algorithms places significant burden on a processor in a radar SoC. Rather than increasing the processing power for each radar SoC on a vehicle to support processing-intensive target detection algorithms, it may be beneficial to transfer radar data (e.g., the output of one or more intermediate processing units of the radar signal processing circuitry 120) to an external processor that is equipped with sufficient data handling and processing power to perform the desired target detection algorithm.

Described herein are methods, systems, and circuitries that support adaptive compression of radar data to facilitate transferring large quantities of radar data to an external processor for target detection. The adaptive compression techniques modify one or more compression parameters based on operating conditions of a vehicle or other device that incorporates the radar system. In this manner, potential losses due to compression can be minimized and an external processing unit can be leveraged to perform additional radar data processing and/or target detection.

Figure 2:
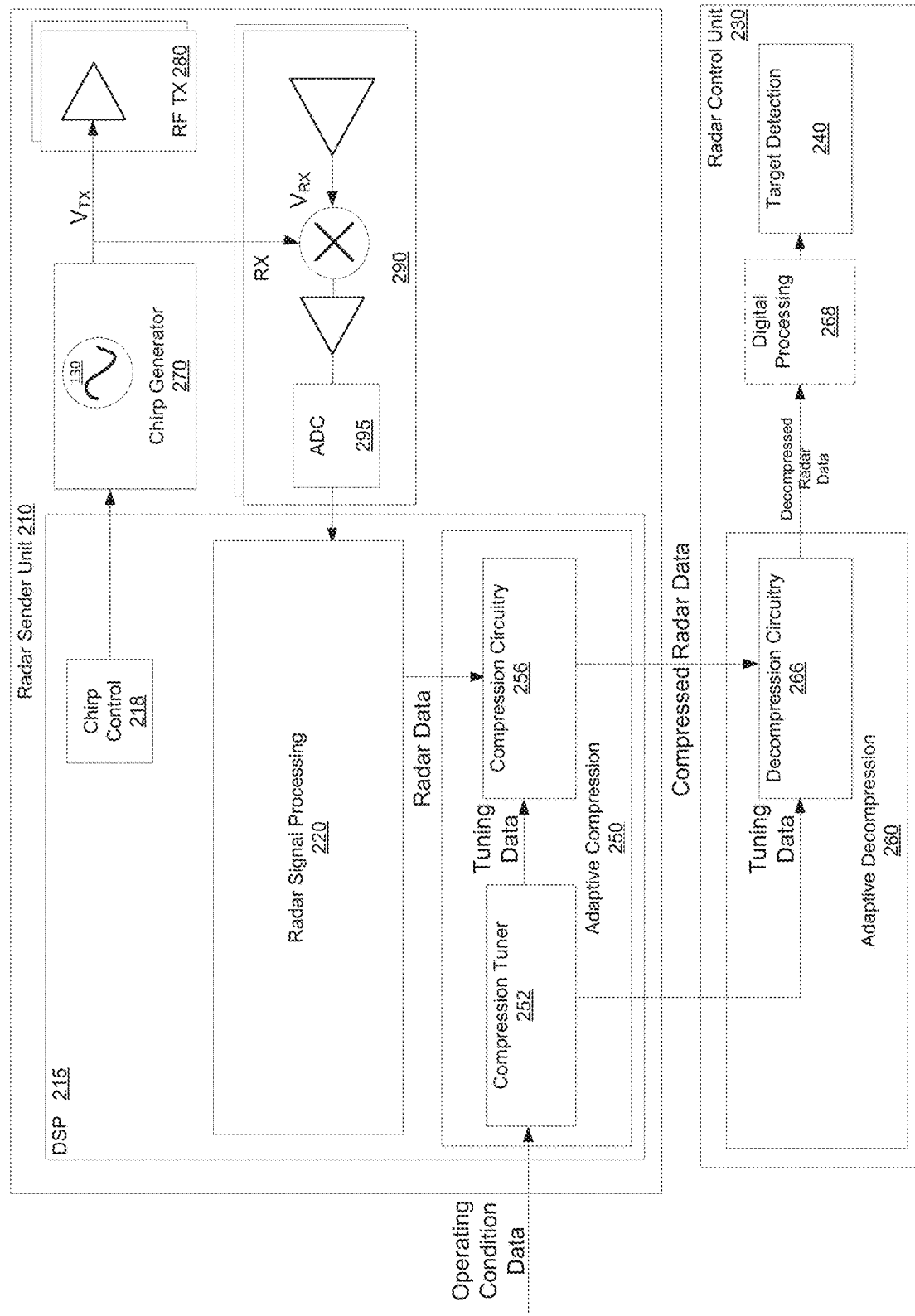
FIG. 2 illustrates an example radar system that includes a radar sender unit and a radar control unit that perform adaptive compression/decompression in accordance with various aspects described.

FIG. 2 illustrates an example radar system that includes a radar sender unit 210 and a radar control unit 230. The radar sender unit 210 includes adaptive compression circuitry 250 and the radar control unit 230 includes adaptive decompression circuitry 260. The adaptive compression circuitry 250 receives radar data from the radar signal processing circuitry and compresses the radar data based on operating condition data to generate compressed radar data. The compressed radar data is sent to the adaptive decompression circuitry 260 of the radar control unit 230 which performs an analogous decompression on the compressed radar data. Target detection circuitry 240 in the radar control unit 230 then processes the decompressed radar data for target detection. In some examples, the radar control unit 230 includes digital processing circuitry 268 that performs some additional processing on the decompressed radar data (e.g., range spectrum, range Doppler, or range azimuth analysis) prior to or alternatively to the target detection circuitry 240 performing target detection. In this manner, processor intensive operations may be performed by the radar control unit 230, conserving or reducing the processing power of the radar sender unit 210.

The adaptive compression circuitry 250 includes compression tuner circuitry 252 and compression circuitry 256. The compression circuitry 256 performs a compression operation on the radar data. The compression operation is performed according to several compression parameters. Compression parameters include desired compression quality (e.g., data rate) and/or other compression algorithm features that may be adapted. The compression circuitry 256 selects values for the compression parameters based on compression tuning data (hereinafter "tuning data") received from the compression tuner circuitry 252. The compression tuner circuitry 252 determines the tuning data based on operating condition data indicative of the environment and present operation of a vehicle or other device in which the radar sender unit 210 is installed.

The compressed radar data is provided or transmitted to the radar control unit 230. The transmission may be accomplished by way of a wired or wireless connection between the radar sender unit 210 and the radar control unit 230.

The adaptive decompression circuitry 260 includes decompression circuitry 266. The decompression circuitry 266 performs a decompression operation (which is the inverse of the compression operation performed by 266) on the compressed radar data. The decompression operation is performed according to several decompression parameters (corresponding to the compression parameters of the compression circuitry 266). The decompression circuitry 266 selects values for the decompression parameters based on tuning data received from the compression tuner circuitry 252. In this manner the decompression circuitry 266 will perform decompression adapted in the same manner as the compression performed by the compression circuitry 256.

While the compression tuner 252 is illustrated as being incorporated in radar sender unit/adaptive compression circuitry 250, in other examples the compression tuner is incorporated in the radar control unit 230 or another external processing unit. In these examples, the compression tuner transmits the tuning data to adaptive compression circuitry 256 and/or decompression circuitry 266 within the radar system.

Figure 3:
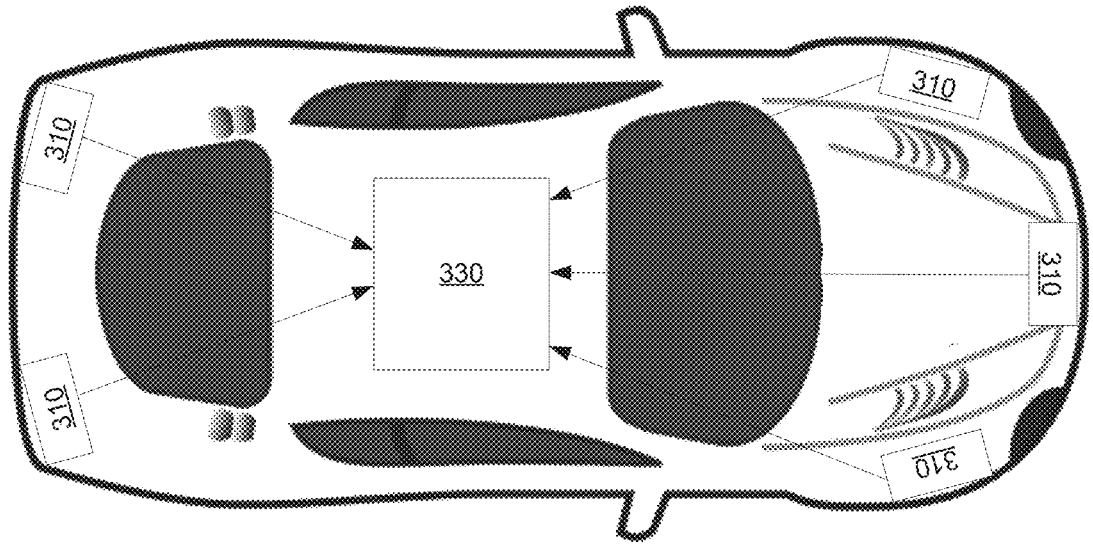
FIG. 3 illustrates a vehicle that includes a plurality of radar sender units and a central radar control unit in accordance with various aspects described.

FIG. 3 illustrates a vehicle in which several radar sender units 310 are installed. The radar sender units 310 transmit compressed radar data to a central radar unit 330 as shown in FIG. 2. It can be seen that the central radar unit 330 is leveraged to perform processing on radar data from several radar sender units, reducing the necessary processing power for the radar sender units.

Figure 4:
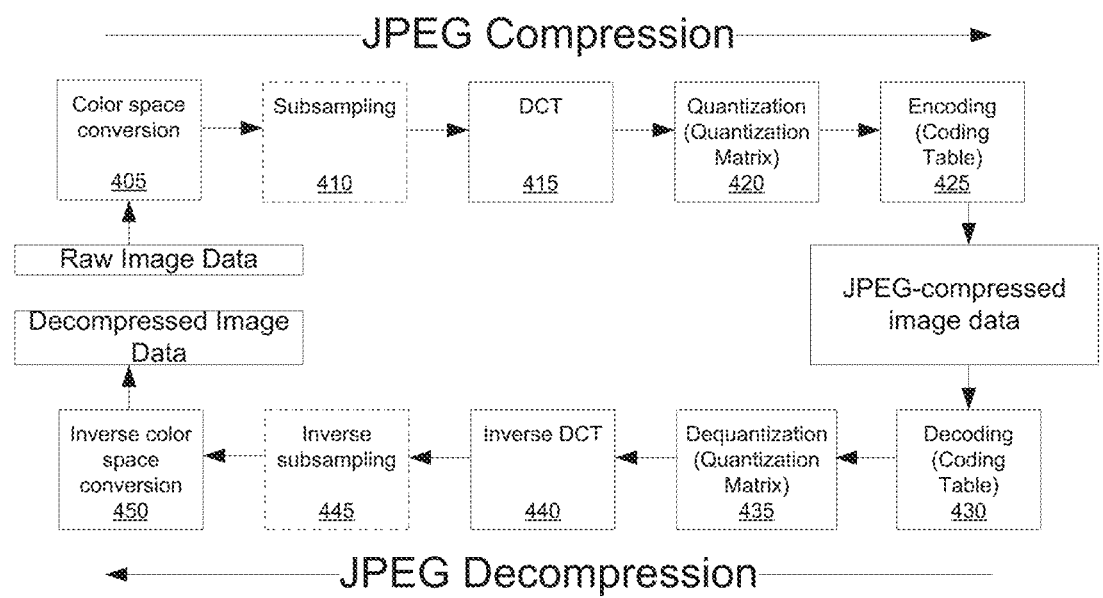
FIG. 4 illustrates an example JPEG compression process.

FIG. 4 illustrates an overview of a JPEG compression process. During color space conversion 405, raw radar image data is converted to chroma data or pixels that indicate brightness. At 410, the chroma data may be sub-sampled to optionally reduce resolution and at 415 a discrete cosine transform (DCT) is performed on each block of pixels, the output of which is a two dimensional matrix of DCT coefficients in which lower frequency components occupy the top left quadrant while higher frequency components occupy the bottom right quadrant. This portion of the JPEG compression process is lossless.

At 420 the amplitudes of the frequency components in the transformed pixel data are quantized. The quantization step introduces loss into the compression process. A quantization matrix is used for this step in the JPEG compression process. The value of each element in the quantization matrix controls the compression ratio for the corresponding element in the DCT coefficient matrix. When JPEG compression is performed on images that are perceptible to the human eye, the elements in the quantization matrix are selected and arranged to perform maximum compression on the higher frequency (less visible) elements in the DCT coefficient matrix. However, different quantization matrices may be considered for radar data. Further, different quantization matrices may be used to best quantize radar data in different visibility conditions and different terrains that may impact the nature of the reflected radar signals. Thus, the quantization matrix is one compression parameter that may be adapted or selected by compression tuner circuitry based on operating conditions and/or a desired compression quality.

The quantized DCT coefficient matrix is then encoded. The compressed image data includes an ordered list of encoded quantized DCT coefficients. Huffman coding is one type of encoding used during JPEG compression. In Huffman coding, moving in a diagonal pattern (of increasing spatial frequency) through the quantized DCT coefficient matrix, a difference between the present element and the previous element is recorded, reducing the number of bits necessary to represent the information in the quantized DCT coefficient matrix. A coding table is used to assign a bit code to each element in the DCT coefficient matrix with the goal of assigning bit codes having the fewest bits to the most frequently occurring element values. The coding table is derived based on the number of elements in the encoded DCT coefficient matrix. The coding table is another compression parameter that may be selected or adapted by compression tuner circuitry based on operating conditions.

In JPEG decompression, at 430 the compressed image data is decoded using the same coding table and at 435 the DCT matrix is derived from the decoded data using the same quantization matrix. An inverse DCT is performed on the DCT matrix at 440 and inverse subsampling at 445 and inverse color space conversion at 450 result in decompressed image data that should approximate the raw image data.

Some examples in the disclosure are described using JPEG compression and specifically quantization matrices and/or coding tables as compression parameters that may be adapted based on operating conditions. However, other compression methods may be used by the adaptive compression circuitry and thus other compression parameters may be selected or adapted as appropriate. For example, if a block-floating point (GxMn) compression is used the number of x samples per block and/or the n bits used as the mantissa may be adapted based on operating conditions.

Figure 5:
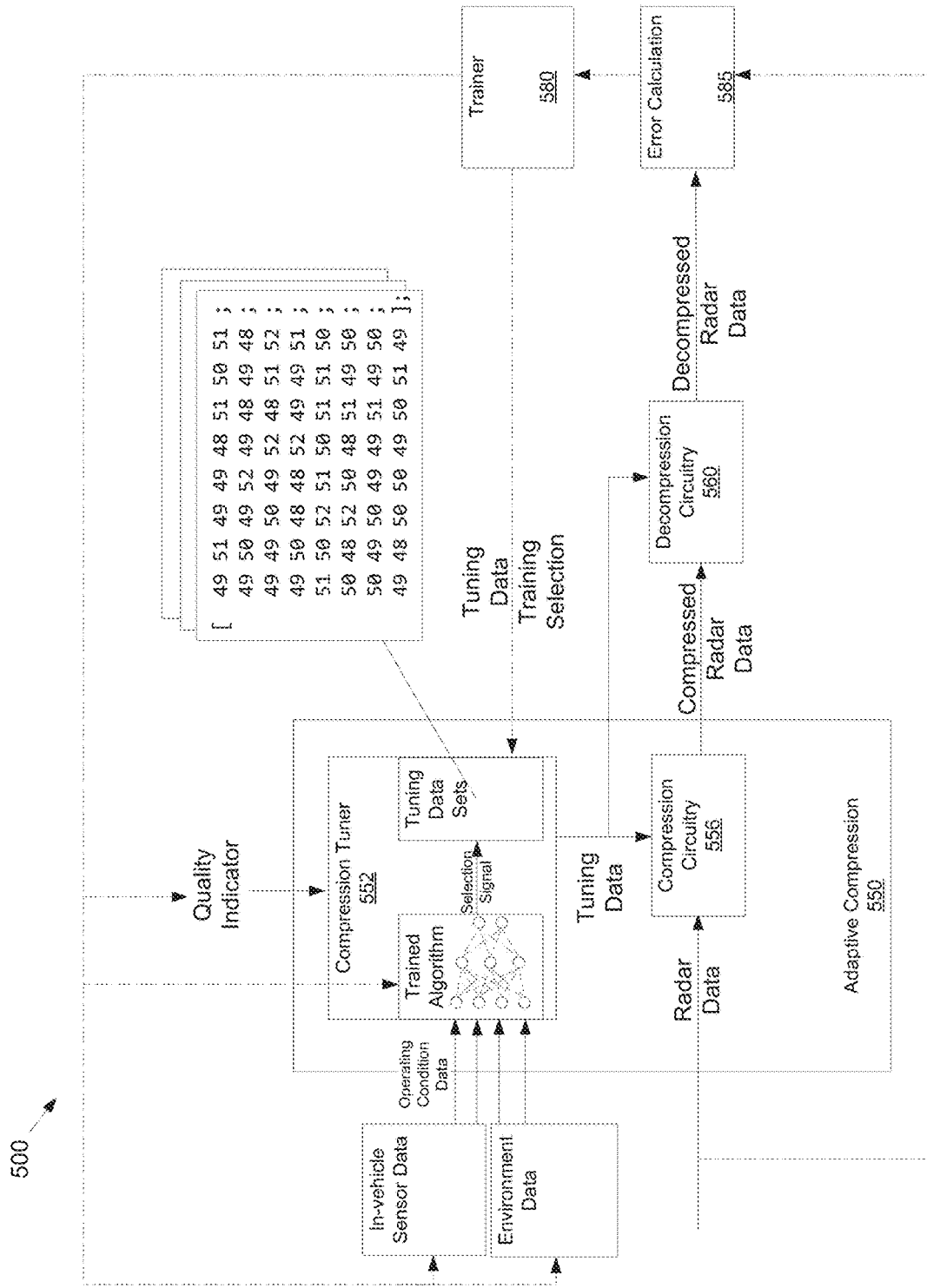
FIG. 5 illustrates an example tuning process for adaptive compression in accordance with various aspects described.

FIG. 5 illustrates an example adaptive compression training system 500 in which compression tuner 552 is trained with an algorithm that is used to select a set of tuning data (e.g., a set of a quantization matrices and coding tables if JPEG compression is used) based on operating condition data. The training system includes trainer circuitry 580 and error calculation circuitry 585. The training system may not be incorporated into the radar sender unit or radar control unit, but rather may be implemented using external components coupled to adaptive compression circuitry 550 during a training procedure that occurs in a laboratory or manufacturing setting. The resulting trained algorithm and tuning data sets may then be stored in memory accessible to adaptive compression circuitry and adaptive decompression circuitry in radar sender units and radar control units.

During normal operation operating condition data is received from in-vehicle sensors and other vehicle systems that determine the vehicle's environment or operating condition. For example, in-vehicle sensor data may include data from speed sensing, braking system sensors, steering sensors, altitude sensors, and so on. Environment data may include image data from a camera which may indicate visibility factors like brightness, reflectiveness, and clarity (i.e., presence of fog or smoke). Environment data may also include data from a navigation system (e.g., map or GPS) that could indicate the surrounding terrain and predict changes in vehicle direction including altitude due to road configuration. During training, trainer circuitry 580 controls or artificially sets values for operating condition data that is input to compression tuner circuitry 552 to represent expected operating conditions.

The trainer circuitry 580 may also set different values for the quality indicator value during the training. The quality indicator value may control various aspects of the compression process. In one example, the quality indicator indicates a quality factor Q that determines the compression quality. In general, a higher the quality factor results in a smaller difference between the original data and the decompressed data. During training, the quality indicator can be used to control the target error that is used to determine when the training process is complete. For example, if Emax is the tolerable maximum error, then the target error will be a function $F(Q) \times Emax$. The function $F(Q)$ may be a linear function $(100-Q)/100$. Thus when Q=100, the target error will be 0 and when Q=50, the target error will be 50% of Emax.

In another example, Q can be a function that maps input data size to a target output (compressed) data size. For example, when Q=100, the compressed data size would be equal to the input data size and when Q=50, the compressed data size would be half the size of the input data size. Q may also be a non-linear function in some examples. When JPEG compression is used, the Q may determine a proportional constant for using the quantization table, which affects the compression ratio.

For each set or operating condition values (or ranges of values), error calculation circuitry generates an error signal indicative of a difference between the radar data input to compression circuitry 556 and the decompressed radar data generated by adaptive decompression circuitry 560. Based on the error signal, the trainer 580 selects a different tuning data (e.g., a different quantization matrix as shown in FIG. 5 and/or coding table) and also may adjust a trained algorithm used by the compression tuner 552 to minimize the error signal for the particular values or ranges of the operating conditions. Once tuning data is determined that minimizes the error, the trainer circuitry 580 maps a selection signal generated by the trained algorithm in response to the operating condition values to a particular set of tuning data (e.g. a particular quantization matrix and/or coding table) that provides the most accurate compression. This mapping is stored in the compression tuner circuitry 552 along with the tuning data sets and the trained algorithm.

Figure 6:
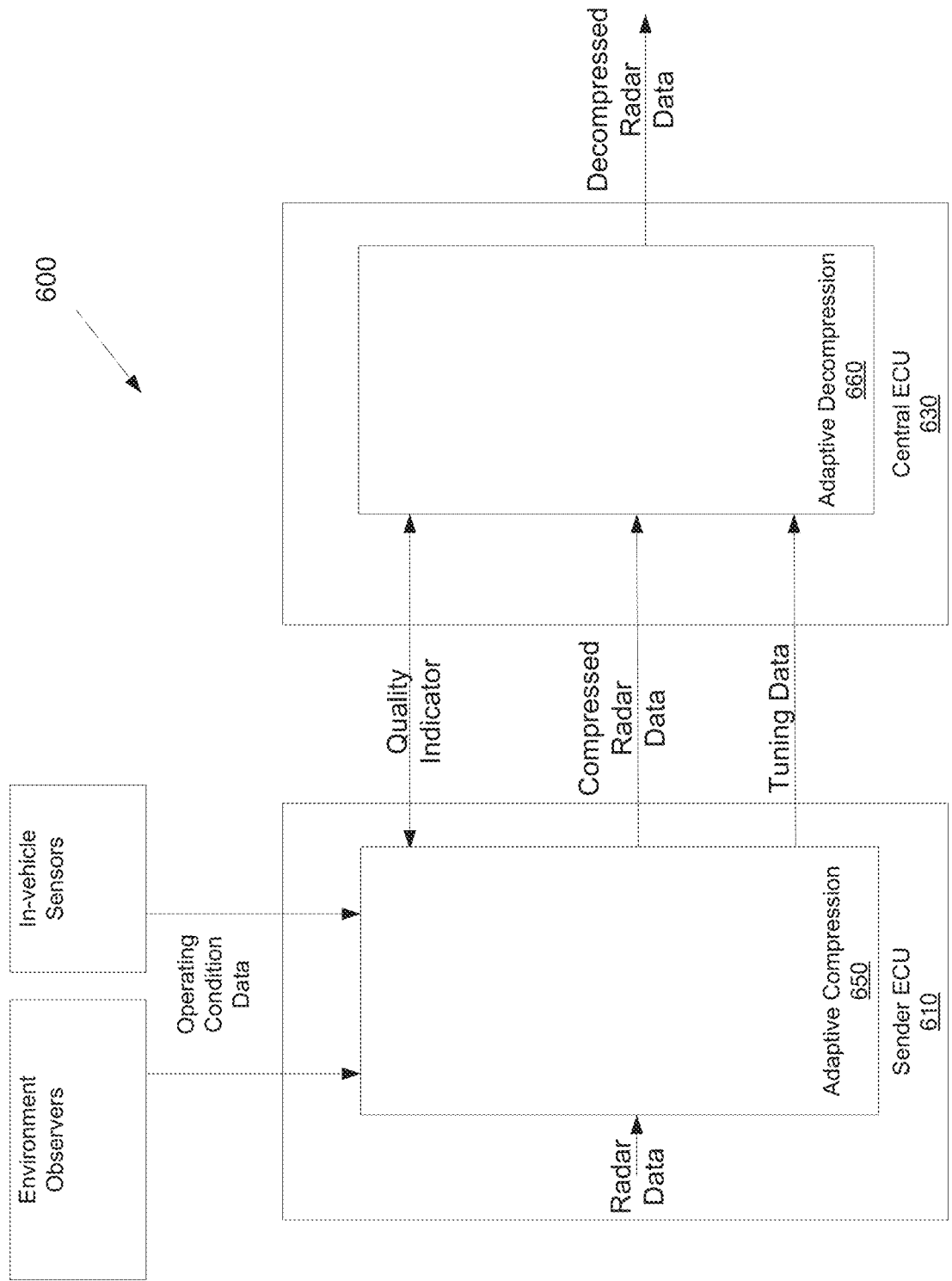
FIG. 6 illustrates an example radar system that performs adaptive compression/decompression in accordance with various aspects described.

FIG. 6 illustrates an example radar system 600 that includes a sender ECU 610 and a central ECU 630. The radar system 600 may be configured to be installed in a vehicle (see FIG. 3) and in some examples, the system 600 includes several sender ECUs 610. The sender ECU receives operating condition data from environment observers and in-vehicle sensors as described with reference to FIG. 5. A quality indicator setting (e.g., desired compression ratio, and so on) is provided to the sender ECU 610 and the central ECU 630. Adaptive compression circuitry 650 determines tuning data based on the operating condition data (and optionally the quality indicator) and compresses radar data based on the tuning data. The sender ECU transmits compressed radar data and the tuning data to adaptive decompression circuitry in the central ECU 630. The adaptive decompression circuitry 660 decompresses the compressed radar data based on the tuning data and provides the decompressed radar data for use in further processing, including target detection.

Figure 7:
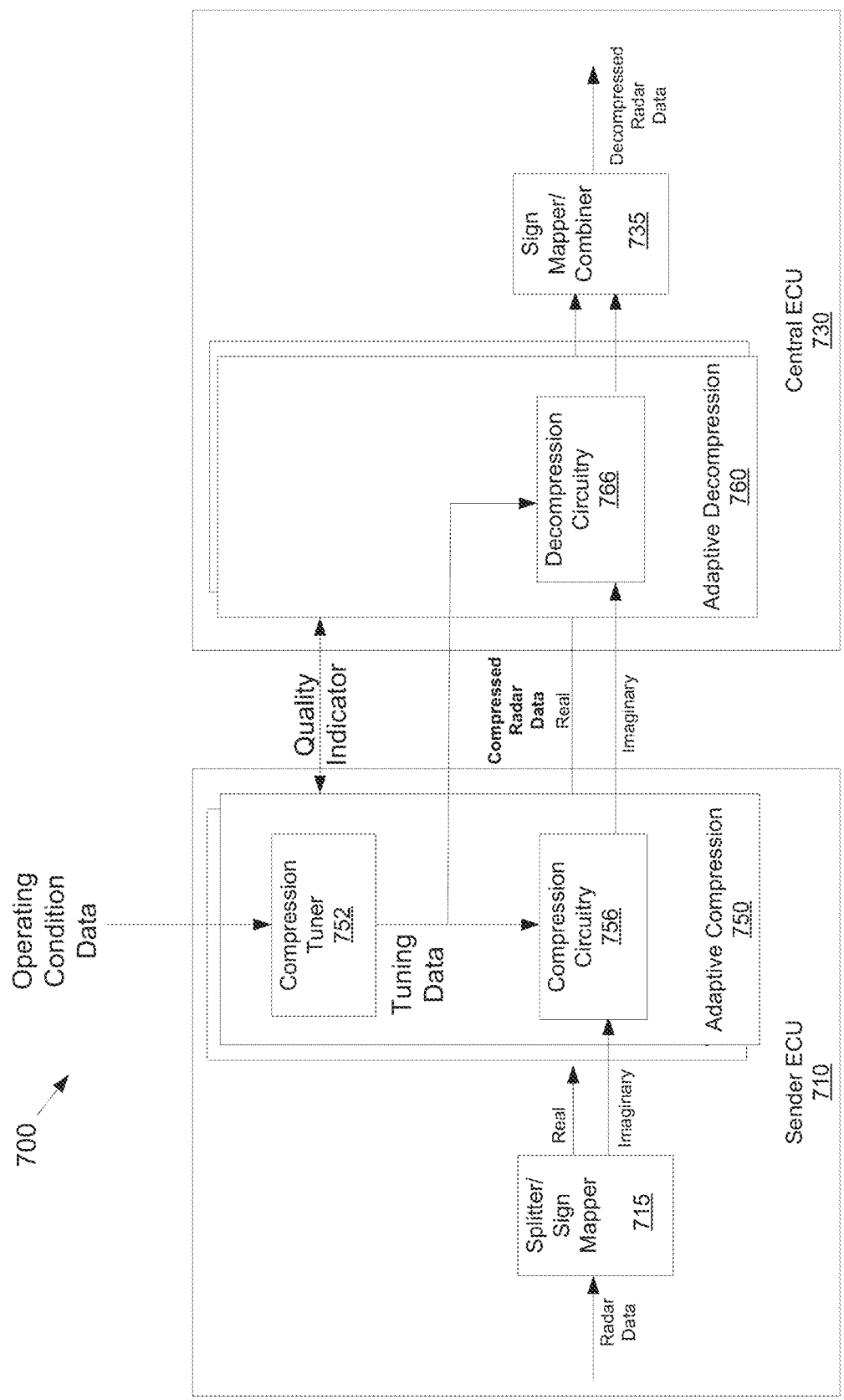
FIG. 7 illustrates an example radar system that performs adaptive compression/decompression on signed and complex valued radar data in accordance with various aspects described.

FIG. 7 illustrates an example radar system 700 that is capable of adaptively compressing signed, complex valued radar data. The system 700 includes a sender ECU 710 and a central ECU 730. The sender ECU 710 includes adaptive compression circuitry 750 and the central ECU 730 includes adaptive decompression circuitry 760. A compression tuner 752 in the adaptive compression circuitry 750 determines tuning data based on operating condition data and provides the tuning data to compression circuitry 756 and decompression circuitry 766.

The sender ECU 710 includes splitter/sign mapper circuitry 715 that receives signed, complex valued radar data. The splitter/sign mapper circuitry 715 splits the complex valued radar data into real and imaginary parts and then for each part, maps signed radar data to signed or unsigned radar data, as suitable to the particular compression algorithm. Hereinafter, "radar data suitable for compression" refers to radar data that results from mapping of data that cannot be processed by the compression algorithm (e.g., signed data in some examples) to data that can be processed by the compression algorithm (e.g., unsigned data).

In a first pass, the real part of the radar data suitable for compression is provided to the adaptive compression circuitry 750 which compresses the received real part of the radar data suitable for compression based on tuning data. In a second pass, the imaginary part of the radar data suitable for compression is provided to the adaptive compression circuitry 750 which compresses the received imaginary part of the radar data suitable for compression. The adaptive compression circuitry 750 provides the compressed real part of the radar data suitable for compression and the compressed imaginary part of the radar data suitable for compression in separate blocks to the adaptive decompression circuitry 760.

Similarly, in two passes, the decompression circuitry 766 decompresses the received compressed real and imaginary parts of the radar data suitable for compression and outputs the resulting real and imaginary parts of decompressed radar data suitable for compression. The central ECU 730 includes sign mapper/combiner circuitry 735 that receives the real and imaginary parts of the decompressed radar data suitable for compression. The mapper/combiner circuitry 735 maps the real part of the decompressed radar data suitable for compression to signed real part of the decompressed radar data and also maps the imaginary part of the decompressed radar data suitable for compression to signed imaginary part of the decompressed radar data. The sign mapper/combiner circuitry 735 then combines the signed real part of the decompressed radar data and signed imaginary part of the decompressed radar data to generate signed complex valued decompressed radar data, which is provided for further processing, including target detection.

Figure 8:
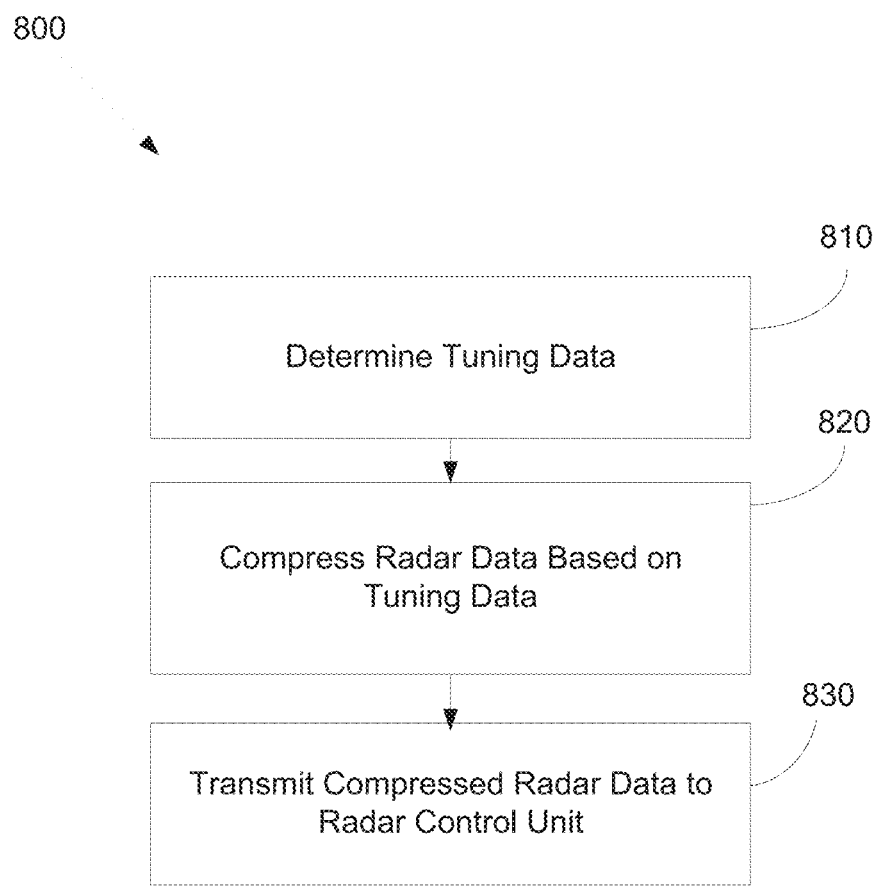
FIG. 8 illustrates an example method for adaptively compressing a radar signal in accordance with various aspects described.

FIG. 8 illustrates an example method 800 for performing dynamic compression on radar data. The method 800 may be performed, for example by adaptive compression circuitry in a radar sender unit, a radar control unit, a sender ECU, or a central ECU as described in FIGS. 2-7. The method includes, at 810, determining tuning data. The tuning data is based on one or more operating conditions. The method includes, at 820, compressing the radar data based on the tuning data. At 830 the compressed radar data is transmitted to a radar control unit for further processing.

The radar data may comprise time-domain radar amplitude data, range spectrum data, range Doppler spectrum data, or range angle azimuth and/or elevation spectrum data.

The compressing may be performed according to a JPEG based compression technique and in this example, the tuning data may be a quantization matrix selected from a plurality of quantization matrices and/or a Huffman coding table selected from a plurality of Huffman coding tables.

The method 800 may also include receiving operating condition data indicative of one or more operating conditions and determining determine the tuning data based on the operating condition data. The operating condition data may be received from a camera and is indicative of visibility conditions proximate to the radar sender unit. The operating condition data may be received from a navigation system and is indicative of terrain or road configuration proximate to the radar sender unit. The operating condition data may be received from an in-vehicle sensor and may be indicative of a velocity and or steering angle of the vehicle and/or a temperature of the radar sender unit.

It can be seen from the foregoing description that the described systems, circuitries, and methods support compression of radar data in a manner that minimizes losses so that radar data may be transmitted to a separate unit for processing.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, circuitries, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for generating a frequency hopping radar signal according to embodiments and examples described herein.

Example 1 is a radar sender unit, including adaptive compression circuitry configured to determine tuning data, wherein the tuning data is based on one or more operating conditions; compress radar data based on the tuning data; and transmit the compressed radar data to a radar control unit for further processing.

Example 2 includes the subject matter of example 1, including or omitting optional elements, wherein the radar data includes time-domain radar amplitude data.

Example 3 includes the subject matter of example 1, including or omitting optional elements, wherein the radar data includes range spectrum data.

Example 4 includes the subject matter of example 1, including or omitting optional elements, wherein the radar data includes range Doppler spectrum data.

Example 5 includes the subject matter of example 1, including or omitting optional elements, wherein the radar data includes range angle azimuth spectrum data or range elevation spectrum data.

Example 6 includes the subject matter of example 1, including or omitting optional elements, wherein the adaptive compression circuitry is configured to use a JPEG based compression technique and further wherein the tuning data includes a quantization matrix selected from a plurality of quantization matrices, wherein the quantization matrices are optimized for radar data.

Example 7 includes the subject matter of example 1, including or omitting optional elements, wherein the adaptive compression circuitry is configured to use a JPEG based compression technique and further wherein the tuning data includes a Huffman coding table selected from a plurality of Huffman coding tables.

Example 8 includes the subject matter of example 1, including or omitting optional elements, further including compressing tuner circuitry configured to receive operating condition data indicative of one or more operating conditions; and determine the tuning data based on the operating condition data.

Example 9 includes the subject matter of example 8, including or omitting optional elements, wherein the operating condition data is received from a camera and is indicative of visibility conditions proximate to the radar sender unit.

Example 10 includes the subject matter of example 8, including or omitting optional elements, wherein the operating condition data is received from a navigation system and is indicative of terrain or road configuration proximate to the radar sender unit.

Example 11 includes the subject matter of example 8, including or omitting optional elements, wherein the operating condition data is received from an in-vehicle sensor and is indicative of a velocity of the radar sender unit.

Example 12 includes the subject matter of example 1, including or omitting optional elements, wherein the radar data is complex valued, and the radar sender unit further includes splitter/sign mapper circuitry configured to receive the radar data, split the radar data into a real part of the radar data and imaginary part of the radar data; provide the real part of the radar data and imaginary part of the radar data to the adaptive compression circuitry. The adaptive compression circuitry is configured to, in a first pass, compress the real part of the radar data, in a second pass, compress the imaginary part of the radar data, and transmit the compressed real part of the radar data and the compressed imaginary part of the radar data in separate blocks to the radar control unit.

Example 13 includes the subject matter of example 1, including or omitting optional elements, wherein the radar data is complex valued, and the radar sender unit further includes splitter/sign mapper circuitry configured to receive the radar data, split the radar data into a real part of the radar data and an imaginary part of the radar data; map the real part of the radar data to real radar data suitable for compression and map the imaginary part of the radar data to imaginary radar data suitable for compression; provide the real part of the radar data suitable for compression and imaginary part of the radar data suitable for compression to the adaptive compression circuitry. The adaptive compression circuitry is configured to, in a first pass, compress the real part of the radar data suitable for compression, in a second pass, compress the imaginary part of the radar data suitable for compression, and transmit the compressed real part of the radar data suitable for compression and the compressed imaginary part of the radar data suitable for compression in separate blocks to the radar control unit.

Example 14 is a radar control unit, including adaptive decompression circuitry configured to receive compressed radar data; determine tuning data, wherein the tuning data is based on one or more operating conditions; decompress the compressed radar data based on the tuning data; and process the decompressed radar data to detect one or more targets.

Example 15 includes the subject matter of example 14, including or omitting optional elements, wherein the adaptive decompression circuitry is configured to use a JPEG based decompression technique and further wherein the tuning data includes a quantization matrix selected from a plurality of quantization matrices, wherein the quantization matrices are optimized for radar data.

Example 16 includes the subject matter of example 14, including or omitting optional elements, wherein the adaptive decompression circuitry is configured to use a JPEG based decompression technique and further wherein the tuning data includes a Huffman coding table selected from a plurality of Huffman coding tables.

Example 17 includes the subject matter of example 14, including or omitting optional elements, wherein the adaptive decompression circuitry is further configured to receive the tuning data from a radar sender unit that transmits the compressed radar data.

Example 18 includes the subject matter of example 14, including or omitting optional elements, further including sign mapper/combiner circuitry configured to receive the compressed radar data, split the compressed radar data into a real part of the radar data and an imaginary part of the compressed radar data; provide the real part of the compressed radar data and the imaginary part of the compressed radar data to the adaptive decompression circuitry. The adaptive decompression circuitry is configured to, in a first pass, decompress the real part of the compressed radar data, in a second pass, decompress the imaginary part of the compressed radar data, and combine the decompressed real part of the radar data and the decompressed imaginary part of the radar data to generate complex decompressed radar data.

Example 19 is a method, including, with a radar sender unit installed in a vehicle: determining tuning data, wherein the tuning data is based on one or more operating conditions of the vehicle; compressing radar data based on the tuning data; and transmitting the compressed radar data to a radar control unit for further processing.

Example 20 includes the subject matter of example 19, including or omitting optional elements, wherein the radar data includes time-domain radar amplitude data, range spectrum data, range Doppler spectrum data, range angle azimuth spectrum data, or range elevation spectrum data.

Example 21 includes the subject matter of example 19, including or omitting optional elements, further including using a JPEG based compression technique to compress the radar data and wherein the tuning data includes a quantization matrix selected from a plurality of quantization matrices, wherein the quantization matrices are optimized for radar data.

Example 22 includes the subject matter of example 19, including or omitting optional elements, further including using a JPEG based compression technique to compress the radar data and wherein the tuning data includes a Huffman coding table selected from a plurality of Huffman coding tables.

Example 23 includes the subject matter of example 19, including or omitting optional elements, further including receiving operating condition data indicative of one or more operating conditions; and determining the tuning data based on the operating condition data.

Example 24 includes the subject matter of example 19, including or omitting optional elements, further including receiving the radar data, splitting the radar data into a real part of the radar data and imaginary part of the radar data; in a first pass, compressing the real part of the radar data; in a second pass, compressing the imaginary part of the radar data; and transmitting the compressed real part of the radar data and the compressed imaginary part of the radar data in separate blocks to the radar control unit.

Example 25 includes the subject matter of example 19, including or omitting optional elements, further including receiving the radar data, splitting the radar data into a real part of the radar data and an imaginary part of the radar data; mapping the real part of the radar data to real radar data suitable for compression and map the imaginary part of the radar data to imaginary radar data suitable for compression; in a first pass, compressing the real part of the radar data suitable for compression; in a second pass, compressing the imaginary part of the radar data suitable for compression; and transmitting the compressed real part of the radar data suitable for compression and the compressed imaginary part of the radar data suitable for compression in separate blocks to the radar control unit.

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

Various illustrative logics, logical blocks, modules, circuitries, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In the present disclosure like reference numerals are used to refer to like elements throughout, and wherein the illustrated structures and devices are not necessarily drawn to scale. As utilized herein, terms "module", "component," "system," "circuit," "circuitry," "element," "slice," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

It will be understood that when an element is referred to as being "electrically connected" or "electrically coupled" to another element, it can be physically connected or coupled to the other element such that current and/or electromagnetic radiation can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

What is claimed is:

1. A radar sender unit, comprising adaptive compression circuitry, wherein:
    the adaptive compression circuitry comprises compressing tuner circuitry configured to:
        receive operating condition data indicative of one or more operating conditions; and
        determine tuning data based on the operating condition data;
    the operating condition data is received from at least one of a camera, a navigation system, and a non-radar sensor; and
    the adaptive compression circuitry is configured to:
        adapt generated radar data for a JPEG-based compression technique;
        compress the radar data based on the tuning data using the JPEG-based compression technique; and
        transmit the compressed radar data to a radar control unit for further processing.

2. The radar sender unit of claim 1, wherein the radar data comprises time-domain radar amplitude data.

3. The radar sender unit of claim 1, wherein the radar data comprises range spectrum data.

4. The radar sender unit of claim 1, wherein the radar data comprises range Doppler spectrum data.

5. The radar sender unit of claim 1, wherein the radar data comprises range angle azimuth spectrum data or range elevation spectrum data.

6. The radar sender unit of claim 1, wherein the tuning data comprises a quantization matrix selected from a plurality of quantization matrices, wherein the quantization matrices are optimized for radar data.

7. The radar sender unit of claim 1, wherein the tuning data comprises a Huffman coding table selected from a plurality of Huffman coding tables.

8. The radar sender unit of claim 1, wherein the operating condition data is received from a camera and is indicative of visibility conditions proximate to the radar sender unit.

9. The radar sender unit of claim 1, wherein the operating condition data is received from a navigation system and is indicative of terrain or road configuration proximate to the radar sender unit.

10. The radar sender unit of claim 1, wherein:
the operating condition data is received from an in-vehicle non-radar sensor and is indicative of a ground velocity of the radar sender unit; and
the non-radar sensor is one of a speed sensor, a braking system sensor, a steering sensor, and an altitude sensor.

11. The radar sender unit of claim 1, wherein the radar data is complex valued, the radar sender unit further comprising:
splitter/sign mapper circuitry configured to
receive the radar data,
split the radar data into a real part of the radar data and imaginary part of the radar data;
provide the real part of the radar data and imaginary part of the radar data to the adaptive compression circuitry; and
wherein the adaptive compression circuitry is configured to
in a first pass, compress the real part of the radar data,
in a second pass, compress the imaginary part of the radar data, and
transmit the compressed real part of the radar data and the compressed imaginary part of the radar data in separate blocks to the radar control unit.

12. The radar sender unit of claim 1, wherein the radar data is complex valued, the radar sender unit further comprising:
splitter/sign mapper circuitry configured to
receive the radar data,
split the radar data into a signed real part of the radar data and a signed imaginary part of the radar data;
map the signed real part of the radar data to unsigned real radar data suitable for compression and map the signed imaginary part of the radar data to unsigned imaginary radar data suitable for compression;
provide the real part of the radar data suitable for compression and the imaginary part of the radar data suitable for compression to the adaptive compression circuitry; and
wherein the adaptive compression circuitry is configured to
in a first pass, compress the real part of the radar data suitable for compression,
in a second pass, compress the imaginary part of the radar data suitable for compression, and
transmit the compressed real part of the radar data suitable for compression and the compressed imaginary part of the radar data suitable for compression in separate blocks to the radar control unit.

13. The radar sender unit of claim 1, wherein:
the radar sender unit is configured to store a plurality of quantization matrices optimized for complex-valued radar data; and
the adaptive compression circuitry is configured to:
select a quantization matrix from the plurality of quantization matrices based on the received operating condition data, wherein the determined tuning data comprises the selected quantization matrix; and
use the JPEG-based compression technique to compress the radar data using the selected quantization matrix.

14. A radar control unit, comprising:
adaptive decompression circuitry configured to
receive compressed radar data from a radar sender unit;
receive tuning data from the radar sender unit, wherein the tuning data is based on one or more operating conditions;
decompress the compressed radar data based on the tuning data using a JPEG-based decompression technique; and
process the decompressed radar data to detect one or more targets.

15. The radar control unit of claim 14, wherein the tuning data comprises a quantization matrix selected from a plurality of quantization matrices, wherein the quantization matrices are optimized for radar data.

16. The radar control unit of claim 14, wherein the tuning data comprises a Huffman coding table selected from a plurality of Huffman coding tables.

17. The radar control unit of claim 14, further comprising:
sign mapper/combiner circuitry configured to
receive the compressed radar data;
split the compressed radar data into a real part of the radar data and an imaginary part of the compressed radar data;
provide the real part of the compressed radar data and the imaginary part of the compressed radar data to the adaptive decompression circuitry; and
wherein the adaptive decompression circuitry is configured to
in a first pass, decompress the real part of the compressed radar data based on the tuning data;
in a second pass, decompress the imaginary part of the compressed radar data based on the tuning data; and
combine the decompressed real part of the radar data and the decompressed imaginary part of the radar data to generate complex decompressed radar data.

18. A method, comprising:
receiving operating condition data indicative of one or more operating conditions, wherein the operating condition data is received from at least one of a camera, a navigation system, and a non-radar sensor;
determining tuning data based on the operating condition data, wherein the tuning data is based on one or more operating conditions of a vehicle;
adapting generated radar data for a JPEG-based compression technique;
compressing the radar data based on the tuning data using the JPEG-based compression technique; and
transmitting the compressed radar data to a radar control unit for further processing.

19. The method of claim 18, wherein the radar data comprises time-domain radar amplitude data, range spectrum data, range Doppler spectrum data, range angle azimuth spectrum data, or range elevation spectrum data.

20. The method of claim 17, wherein the determining the tuning data comprises selecting a quantization matrix selected from a plurality of quantization matrices, wherein the quantization matrices are optimized for radar data.

21. The method of claim 18, wherein the determining the tuning data comprises selecting a Huffman coding table from a plurality of Huffman coding tables.

22. The method of claim 18, further comprising:
receiving the radar data,
splitting the radar data into a real part of the radar data and imaginary part of the radar data;
in a first pass, compressing the real part of the radar data;
in a second pass, compressing the imaginary part of the radar data; and
transmitting the compressed real part of the radar data and the compressed imaginary part of the radar data in separate blocks to the radar control unit.

23. The method of claim 18, further comprising:
receiving the radar data,
splitting the radar data into a signed real part of the radar data and a signed imaginary part of the radar data;
mapping the signed real part of the radar data to unsigned real radar data suitable for compression;
mapping the signed imaginary part of the radar data to unsigned imaginary radar data suitable for compression;
in a first pass, compressing the real part of the radar data suitable for compression;
in a second pass, compressing the imaginary part of the radar data suitable for compression; and
transmitting the compressed real part of the radar data suitable for compression and the compressed imaginary part of the radar data suitable for compression in separate blocks to the radar control unit.

24. The method of claim 18, comprising:
storing a plurality of quantization matrices optimized for complex-valued radar data;
selecting a quantization matrix from the plurality of quantization matrices based on the received operating condition data, wherein the determined tuning data comprises the selected quantization matrix; and
using the JPEG-based compression technique to compress the radar data using the selected quantization matrix.

* * * * *